(12) United States Patent
Nichols et al.

(10) Patent No.: US 11,646,028 B2
(45) Date of Patent: *May 9, 2023

(54) MULTIPLE INSPECTOR VOICE INSPECTION

(71) Applicant: Hand Held Products, Inc., Charlotte, NC (US)

(72) Inventors: Matthew Nichols, Pittsburgh, PA (US); Alexander Nikolaus Mracna, Seven Fields, PA (US); Kurt Charles Miller, Trafford, PA (US); Russell Evans, Pittsburgh, PA (US); Mark Koenig, Pittsburgh, PA (US); Navaneetha Myaka, Pittsburgh, PA (US); Bernard Kriley, Butler, PA (US); Luke Sadecky, New Kendington, PA (US); Brian L. Manuel, Leechburg, PA (US); Lauren Meyer, Pittsburgh, PA (US)

(73) Assignee: HAND HELD PRODUCTS, INC., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/668,083

(22) Filed: Feb. 9, 2022

(65) Prior Publication Data

US 2022/0270602 A1 Aug. 25, 2022

Related U.S. Application Data

(63) Continuation of application No. 14/840,619, filed on Aug. 31, 2015, now Pat. No. 11,282,515.

(51) Int. Cl.
*G10L 15/22* (2006.01)
*G06Q 10/00* (2012.01)
(Continued)

(52) U.S. Cl.
CPC .............. *G10L 15/22* (2013.01); *G06F 3/167* (2013.01); *G06Q 10/06316* (2013.01);
(Continued)

(58) Field of Classification Search
CPC combination set(s) only.
See application file for complete search history.

(56) References Cited

U.S. PATENT DOCUMENTS

| 5,393,236 A | 2/1995 | Blackmer et al. |
| 6,317,039 B1 | 11/2001 | Thomason |

(Continued)

FOREIGN PATENT DOCUMENTS

| WO | 2013/163789 A1 | 11/2013 |
| WO | 2013/173985 A1 | 11/2013 |

(Continued)

OTHER PUBLICATIONS

US 8,548,242 B1, 10/2013, Longacre (withdrawn)
(Continued)

*Primary Examiner* — Crystol Stewart
(74) *Attorney, Agent, or Firm* — Alston & Bird LLP

(57) ABSTRACT

Systems, methods, and devices of a voice-directed inspection system that supports multiple inspectors in the inspection of business assets are described. Inspection plans for large and complex business assets can involve several steps. It is advantageous to split large inspection plans into non-overlapping sections to allow multiple inspectors to perform concurrent inspections. Such sectionalizing is also useful in training new inspectors.

20 Claims, 7 Drawing Sheets

(51) Int. Cl.
    *G06Q 10/10* (2012.01)
    *G06Q 10/06* (2012.01)
    *G10L 15/08* (2006.01)
    *G10L 15/26* (2006.01)
    *G06F 3/16* (2006.01)
    *G10L 15/00* (2013.01)
    *G10L 19/00* (2013.01)
    *G06Q 10/20* (2023.01)
    *G06Q 10/0631* (2023.01)

(52) U.S. Cl.
    CPC ............ *G06Q 10/103* (2013.01); *G06Q 10/20* (2013.01); *G10L 15/08* (2013.01); *G10L 15/26* (2013.01); *G10L 19/00* (2013.01); *G10L 15/00* (2013.01)

(56) References Cited

U.S. PATENT DOCUMENTS

| | | |
|---|---|---|
| 6,832,725 B2 | 12/2004 | Gardiner et al. |
| 7,128,266 B2 | 10/2006 | Zhu et al. |
| 7,159,783 B2 | 1/2007 | Walczyk et al. |
| 7,413,127 B2 | 8/2008 | Ehrhart et al. |
| 7,726,575 B2 | 6/2010 | Wang et al. |
| 8,019,630 B2 | 9/2011 | Dale |
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Van et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein, Jr. |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre, Jr. |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,736,909 B2 | 5/2014 | Sato et al. |
| 8,740,082 B2 | 6/2014 | Wilz, Sr. |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue et al. |
| 8,866,963 B2 | 10/2014 | Grunow et al. |
| 8,868,421 B2 | 10/2014 | Braho et al. |
| 8,868,519 B2 | 10/2014 | Maloy et al. |

(56) References Cited

U.S. PATENT DOCUMENTS

| | | |
|---|---|---|
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein, Jr. |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | El et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber et al. |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,171,539 B2 | 10/2015 | Funyak et al. |
| 9,224,022 B2 | 12/2015 | Ackley et al. |
| 9,224,027 B2 | 12/2015 | Van et al. |
| D747,321 S | 1/2016 | London et al. |
| 9,230,140 B1 | 1/2016 | Ackley |
| 9,250,712 B1 | 2/2016 | Todeschini |
| 9,258,033 B2 | 2/2016 | Showering |
| 9,261,398 B2 | 2/2016 | Amundsen et al. |
| 9,262,633 B1 | 2/2016 | Todeschini et al. |
| 9,262,662 B2 | 2/2016 | Chen et al. |
| 9,262,664 B2 | 2/2016 | Soule et al. |
| 9,274,806 B2 | 3/2016 | Barten |
| 9,282,501 B2 | 3/2016 | Wang et al. |
| 9,286,106 B1 * | 3/2016 | Huang .................. G06F 9/4881 |
| 9,292,969 B2 | 3/2016 | Laffargue et al. |
| 9,298,667 B2 | 3/2016 | Caballero |
| 9,310,609 B2 | 4/2016 | Rueblinger et al. |
| 9,319,548 B2 | 4/2016 | Showering et al. |
| D757,009 S | 5/2016 | Oberpriller et al. |
| 9,342,724 B2 | 5/2016 | McCloskey et al. |
| 9,342,827 B2 | 5/2016 | Smith |
| 9,355,294 B2 | 5/2016 | Smith et al. |
| 9,367,722 B2 | 6/2016 | Xian et al. |
| 9,373,018 B2 | 6/2016 | Colavito et al. |
| 9,375,945 B1 | 6/2016 | Bowles |
| D760,719 S | 7/2016 | Zhou et al. |
| 9,390,596 B1 | 7/2016 | Todeschini |
| 9,396,375 B2 | 7/2016 | Qu et al. |
| 9,398,008 B2 | 7/2016 | Todeschini et al. |
| D762,604 S | 8/2016 | Fitch et al. |
| D762,647 S | 8/2016 | Fitch et al. |
| 9,405,011 B2 | 8/2016 | Showering |
| 9,407,840 B2 | 8/2016 | Wang |
| 9,412,242 B2 | 8/2016 | Van et al. |
| 9,418,252 B2 | 8/2016 | Nahill et al. |
| D766,244 S | 9/2016 | Zhou et al. |
| 9,443,123 B2 | 9/2016 | Hejl |
| 9,443,222 B2 | 9/2016 | Singel et al. |
| 9,448,610 B2 | 9/2016 | Davis et al. |
| 9,478,113 B2 | 10/2016 | Xie et al. |
| D771,631 S | 11/2016 | Fitch et al. |
| 9,507,974 B1 | 11/2016 | Todeschini |
| D777,166 S | 1/2017 | Bidwell et al. |
| 9,557,166 B2 | 1/2017 | Thuries et al. |
| 9,564,035 B2 | 2/2017 | Ackley et al. |
| 9,582,696 B2 | 2/2017 | Barber et al. |
| D783,601 S | 4/2017 | Schulte et al. |
| 9,616,749 B2 | 4/2017 | Chamberlin |
| 9,618,993 B2 | 4/2017 | Murawski et al. |
| D785,617 S | 5/2017 | Bidwell et al. |
| D785,636 S | 5/2017 | Oberpriller et al. |
| 9,659,183 B2 | 5/2017 | Zhu et al. |
| 9,665,757 B2 | 5/2017 | Feng et al. |
| D790,505 S | 6/2017 | Vargo et al. |
| D790,546 S | 6/2017 | Zhou et al. |
| D790,553 S | 6/2017 | Fitch et al. |
| 9,715,614 B2 | 7/2017 | Todeschini et al. |
| 9,734,493 B2 | 8/2017 | Gomez et al. |
| 9,752,864 B2 | 9/2017 | Laffargue et al. |
| 9,762,793 B2 | 9/2017 | Ackley et al. |
| 9,767,581 B2 | 9/2017 | Todeschini |
| 9,785,948 B1 | 10/2017 | Gutt |
| 9,786,101 B2 | 10/2017 | Ackley |
| 9,794,392 B2 | 10/2017 | Hejl |
| 9,823,059 B2 | 11/2017 | Li et al. |
| 9,852,102 B2 | 12/2017 | Kohtz et al. |
| 9,857,167 B2 | 1/2018 | Jovanovski et al. |
| 9,861,182 B2 | 1/2018 | Oberpriller et al. |
| 9,891,612 B2 | 2/2018 | Charpentier et al. |
| 9,892,876 B2 | 2/2018 | Bandringa |
| 9,897,434 B2 | 2/2018 | Ackley et al. |
| 9,924,006 B2 | 3/2018 | Schoon et al. |
| 9,930,050 B2 | 3/2018 | Yeakley et al. |
| 9,954,871 B2 | 4/2018 | Hussey et al. |

(56) References Cited

U.S. PATENT DOCUMENTS

| | | |
|---|---|---|
| 9,978,088 B2 | 5/2018 | Pape |
| 9,984,685 B2 | 5/2018 | Braho et al. |
| 10,007,112 B2 | 6/2018 | Fitch et al. |
| 10,019,334 B2 | 7/2018 | Caballero et al. |
| 10,021,043 B2 | 7/2018 | Sevier |
| 10,038,716 B2 | 7/2018 | Todeschini et al. |
| 10,060,729 B2 | 8/2018 | Laffargue et al. |
| 10,066,982 B2 | 9/2018 | Ackley et al. |
| 10,121,466 B2 | 11/2018 | Pecorari |
| 10,139,495 B2 | 11/2018 | Payne |
| 10,269,342 B2 | 4/2019 | Braho et al. |
| 10,327,158 B2 | 6/2019 | Wang et al. |
| 10,360,728 B2 | 7/2019 | Venkatesha et al. |
| 10,401,436 B2 | 9/2019 | Young et al. |
| 10,410,029 B2 | 9/2019 | Powilleit |
| 10,810,529 B2 | 10/2020 | Miller et al. |
| 2001/0014877 A1 | 8/2001 | Defrancesco et al. |
| 2002/0138269 A1 | 9/2002 | Philley |
| 2004/0088329 A1 | 5/2004 | Lundblad et al. |
| 2004/0153269 A1 | 8/2004 | Kalas |
| 2005/0075919 A1 | 4/2005 | Kim |
| 2006/0087402 A1 | 4/2006 | Manning et al. |
| 2006/0235611 A1 | 10/2006 | Deaton et al. |
| 2007/0063048 A1 | 3/2007 | Havens et al. |
| 2007/0080930 A1 | 4/2007 | Logan et al. |
| 2007/0150119 A1 | 6/2007 | Mitchell et al. |
| 2007/0239292 A1 | 10/2007 | Ehrman et al. |
| 2008/0071562 A1 | 3/2008 | Clemenson et al. |
| 2008/0185432 A1 | 8/2008 | Caballero et al. |
| 2008/0201388 A1 | 8/2008 | Wood et al. |
| 2009/0134221 A1 | 5/2009 | Zhu et al. |
| 2009/0204470 A1 | 8/2009 | Weyl et al. |
| 2009/0237245 A1 | 9/2009 | Brinton et al. |
| 2010/0128967 A1 | 5/2010 | Steadman |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0265880 A1 | 10/2010 | Rautiola et al. |
| 2011/0169999 A1 | 7/2011 | Grunow et al. |
| 2011/0202554 A1 | 8/2011 | Powilleit et al. |
| 2011/0264452 A1 | 10/2011 | Venkataramu et al. |
| 2011/0301992 A1 | 12/2011 | Staaf |
| 2012/0111946 A1 | 5/2012 | Golant |
| 2012/0158238 A1 | 6/2012 | Daley et al. |
| 2012/0168511 A1 | 7/2012 | Kotlarsky et al. |
| 2012/0168512 A1 | 7/2012 | Kotlarsky et al. |
| 2012/0185260 A1 | 7/2012 | Perez et al. |
| 2012/0193423 A1 | 8/2012 | Samek |
| 2012/0203647 A1 | 8/2012 | Smith |
| 2012/0223141 A1 | 9/2012 | Good et al. |
| 2012/0228382 A1 | 9/2012 | Havens et al. |
| 2012/0248188 A1 | 10/2012 | Kearney |
| 2012/0278117 A1 | 11/2012 | Nguyen et al. |
| 2013/0043312 A1 | 2/2013 | Van Horn |
| 2013/0075168 A1 | 3/2013 | Amundsen et al. |
| 2013/0082104 A1 | 4/2013 | Kearney et al. |
| 2013/0102292 A1 | 4/2013 | Kim |
| 2013/0110590 A1 | 5/2013 | Folk et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0262190 A1 | 10/2013 | Sato et al. |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedrao |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein, Jr. |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0059563 A1 | 2/2014 | Edelstein et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0097249 A1 | 4/2014 | Gomez et al. |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein, Jr. |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Long et al. |
| 2014/0121445 A1 | 5/2014 | Fontenot et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129277 A1 | 5/2014 | Lavrov et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0149164 A1 | 5/2014 | Yumbe et al. |
| 2014/0151453 A1 | 6/2014 | Meier et al. |
| 2014/0152882 A1 | 6/2014 | Samek et al. |
| 2014/0156326 A1 | 6/2014 | D'Arcy et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |

(56) References Cited

U.S. PATENT DOCUMENTS

| | | |
|---|---|---|
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0267609 A1 | 9/2014 | Laffargue |
| 2014/0270196 A1 | 9/2014 | Braho et al. |
| 2014/0270229 A1 | 9/2014 | Braho |
| 2014/0278387 A1 | 9/2014 | Digregorio |
| 2014/0278391 A1 | 9/2014 | Braho et al. |
| 2014/0281967 A1 | 9/2014 | Bodnick et al. |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0297354 A1 | 10/2014 | Kogiso et al. |
| 2014/0299665 A1 | 10/2014 | Barber et al. |
| 2014/0312121 A1 | 10/2014 | Lu et al. |
| 2014/0316998 A1 | 10/2014 | Apostolides |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0039878 A1 | 2/2015 | Barten |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0060544 A1 | 3/2015 | Feng et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071818 A1 | 3/2015 | Scheuren et al. |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099531 A1 | 4/2015 | Steiger et al. |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0120388 A1 | 4/2015 | Tan et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chen et al. |
| 2015/0169929 A1 | 6/2015 | Williams et al. |
| 2015/0178523 A1 | 6/2015 | Gelay et al. |
| 2015/0178534 A1 | 6/2015 | Jovanovski et al. |
| 2015/0178535 A1 | 6/2015 | Bremer et al. |
| 2015/0178536 A1 | 6/2015 | Hennick et al. |
| 2015/0178537 A1 | 6/2015 | El et al. |
| 2015/0181093 A1 | 6/2015 | Zhu et al. |
| 2015/0181109 A1 | 6/2015 | Gillet et al. |
| 2015/0186472 A1 | 7/2015 | Stanic |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0327012 A1 | 11/2015 | Bian et al. |
| 2015/0364138 A1 | 12/2015 | Kamalakannan et al. |
| 2016/0042241 A1 | 2/2016 | Todeschini |
| 2016/0057230 A1 | 2/2016 | Todeschini et al. |
| 2016/0125217 A1 | 5/2016 | Todeschini |
| 2016/0125342 A1 | 5/2016 | Miller et al. |
| 2016/0161947 A1 | 6/2016 | Liao et al. |
| 2016/0178479 A1 | 6/2016 | Goldsmith |
| 2016/0189087 A1 | 6/2016 | Morton et al. |
| 2016/0247110 A1 | 8/2016 | Sinha |
| 2016/0292477 A1 | 10/2016 | Bidwell |
| 2016/0314276 A1 | 10/2016 | Wilz et al. |
| 2016/0314294 A1 | 10/2016 | Kubler et al. |
| 2016/0377414 A1 | 12/2016 | Thuries et al. |
| 2017/0004827 A1 | 1/2017 | Bancalari et al. |
| 2017/0228702 A1 | 8/2017 | Boult et al. |
| 2018/0090134 A1* | 3/2018 | Miller .................. G10L 15/22 |

FOREIGN PATENT DOCUMENTS

| | | |
|---|---|---|
| WO | 2014/019130 A1 | 2/2014 |
| WO | 2014/110495 A1 | 7/2014 |

OTHER PUBLICATIONS

US 8,616,454 B2, 12/2013, Havens et al. (withdrawn)

Advisory Action received for U.S. Appl. No. 14/840,619, dated Nov. 10, 2021, 1 pages.

Extended Search Report in counterpart European Application No. 16185580.4 dated Nov. 4, 2016, pp. 1-7.

Final Office Action received for U.S. Appl. No. 14/840,619, dated Aug. 23, 2021, 32 pages.

Final Rejection dated Aug. 3, 2020 for U.S. Appl. No. 14/840,619.

Final Rejection dated Aug. 7, 2019 for U.S. Appl. No. 14/840,619.

Non-Final Rejection dated Feb. 26, 2020 for U.S. Appl. No. 14/840,619.

Non-Final Rejection dated Jun. 1, 2018 for U.S. Appl. No. 14/840,619.

Non-Final Rejection dated Mar. 15, 2021 for U.S. Appl. No. 14/840,619.

Notice of Allowance received for U.S. Appl. No. 14/840,619, dated Nov. 10, 2021, 17 pages.

R. Behrens, C. Westerkamp, H. Speckmann and W. Bisle, "Knowledge-based mobile remote engineering for maintenance processes," Proceedings of 2012 IEEE 17th International Conference on Emerging Technologies & Factory Automation (ETFA 2012), 2012, pp. 1-7, doi: 10.1109/ETFA.2012.6489658. (Year: 2012).

U.S. Patent Application for a Laser Scanning Module Employing an Elastomeric U-Hinge Based Laser Scanning Assembly, filed Feb. 7, 2012 (Feng et al.), U.S. Appl. No. 13/367,978.

(56) References Cited

OTHER PUBLICATIONS

U.S. Patent Application for Indicia Reader filed Apr. 1, 2015 (Huck), U.S. Appl. No. 14/676,109.
U.S. Patent Application for Multifunction Point of Sale Apparatus With Optical Signature Capture filed Jul. 30, 2014 (Good et al.), U.S. Appl. No. 14/446,391.
U.S. Patent Application for Terminal Having Illumination and Focus Control filed May 21, 2014 (Liu et al.), U.S. Appl. No. 14/283,282.
U.S. Appl. No. 14/277,337 for Multipurpose Optical Reader, filed May 14, 2014 (Jovanovski et al.); 59 pages.
U.S. Appl. No. 14/840,619, filed Aug. 31, 2015, U.S. Pat. No. 11,282,515, Issued.

* cited by examiner

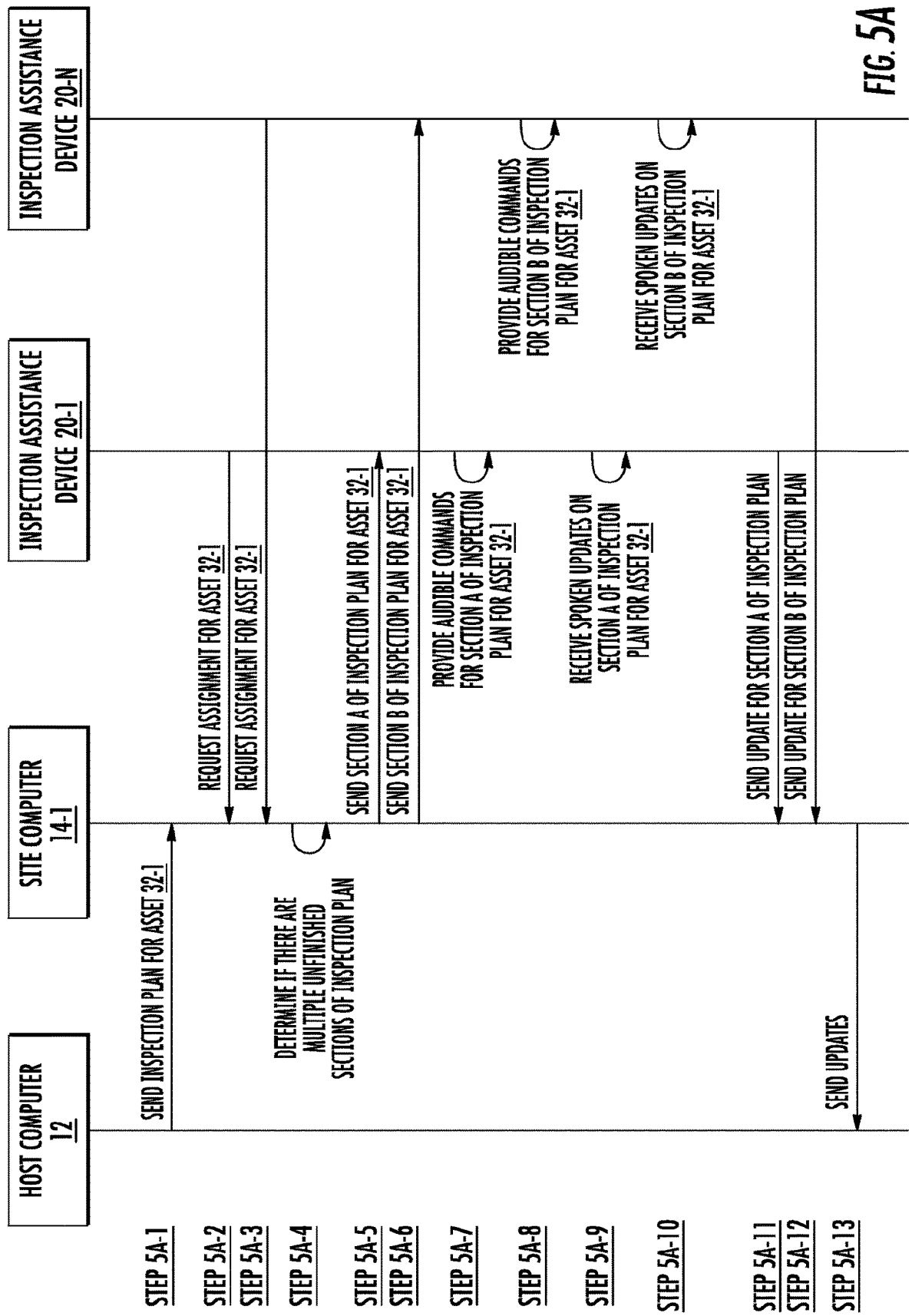

MULTIPLE INSPECTOR VOICE INSPECTION

CROSS-REFERENCE TO RELATED APPLICATIONS

This application is a continuation of U.S. patent application Ser. No. 14/840,619, filed Aug. 31, 2015, which is hereby incorporated herein by reference.

FIELD OF THE INVENTION

Embodiments of the present invention relate to systems, methods, and devices of a voice-directed inspection system that supports multiple inspectors in the inspection of business assets.

BACKGROUND

A company will typically perform regular inspections of its equipment and systems to ensure proper operability of those business assets for the overall health, compliance, and productivity of the company. For example, a trucking company may regularly perform inspections that are required for compliance with interstate commerce laws. A truck inspection may include the steps of checking the lights, braking system, steering system, emission system, and other equipment.

During an inspection, an inspector will typically check certain features of the various systems according to an inspection plan and then record information such as measured values, operability, and/or quality of the various components, etc. The process of recording the observations used to be very labor intensive, requiring the inspector to check boxes or write values on a paper inspection form or entering data in a computer.

Advances in technology, particularly in the area of speech recognition and mobile devices, have simplified many tasks in the workplace by permitting hands-free communication with a computer as a convenient alternative to communication via conventional peripheral input/output devices.

Systems now exist that allow the commands or instructions for an inspection plan to be communicated to the inspector by a speech synthesizer. These systems also permit the inspector to easily enter data about the inspection by voice using a speech recognizer.

Sometimes, however, the inspection plans can be very large. An inspection plan for a large complex asset, such as a jet engine, may involve many steps. For these types of inspections, it is often necessary to have more than one inspector work together to complete the inspection in a reasonable amount of time.

Therefore, a need exists for a voice-directed inspection system that supports multiple inspectors in the inspection of business assets.

SUMMARY

Accordingly, one aspect of the present invention discloses a system, comprising: a first device comprising: a first communication interface; a first control system communicatively coupled to the first communication interface and comprising at least one first hardware processor and a first memory storing program codes operable to: send a first request for a first assignment for an asset to a third device; receive a first section of an inspection plan for the asset from the third device, wherein the first section of the inspection plan identifies first remaining inspection items for the asset; provide first audible commands for completing the first remaining inspection items; receive first audible updates on the completion of the first remaining inspection items; and send the first updates on the completion of the first remaining inspection items to the third device; and a second device comprising: a second communication interface; a second control system communicatively coupled to the second communication interface and comprising at least one second hardware processor and a second memory storing program codes operable to: send a second request for a second assignment for the asset to a third device; receive a second section of the inspection plan for the asset from the third device, wherein the second section of the inspection plan identifies second remaining inspection items for the asset; provide second audible commands for completing the second remaining inspection items; receive second audible updates on the completion of the second remaining inspection items; and send the second updates on the completion of the second remaining inspection items to the third device; and a third device comprising: a third communication interface; a third control system communicatively coupled to the third communication interface and comprising at least one third hardware processor and a third memory storing program codes operable to: receive the inspection plan for the asset from the fourth device; receive the first request for the first assignment for the asset from the first device; receive the second request for the second assignment for the asset from the second device; determine if there are multiple unfinished sections of the inspection plan for the asset; if there are multiple unfinished sections of the inspection plan for the asset, send the first section of the inspection plan for the asset to the first device and send the second section of the inspection plan for the asset to the second device; receive the first updates on the completion of the first remaining inspection items from the first device and receive the second updates on the completion of the second remaining inspection items from the second device; and send the first and second updates to the fourth device; and a fourth device comprising: a fourth communication interface; a fourth control system communicatively coupled to the fourth communication interface and comprising at least one fourth hardware processor and a fourth memory storing program codes operable to: send the inspection plan for the asset to the third device; and receive the first and second updates from the third device.

In other exemplary embodiments, the first device comprises a first headset and a first portable computer device, the second device comprises a second headset and a second portable computer device, the third device comprises a site computer, the fourth device comprises a host computer.

In further exemplary embodiments, the request for an assignment comprises a request for either a specific or for any unfinished section of the inspection plan for the asset.

In still further exemplary embodiments, in determining if there are multiple unfinished sections of the inspection plan for the asset, the third device is further operable to: identify unfinished sections of the inspection plan; and determine if the unfinished sections of the plan do not interfere with one another.

In other exemplary embodiments, in determining if the unfinished sections of the plan do not interfere with one another, the third device is further operable to: determine that the unfinished sections of the plan pertain to physically distinct parts of the asset.

In more embodiments, the third device is further operable to: associate more than one identifier to the inspection plan for the asset.

In additional embodiments, the first updates on the completion of the first remaining inspection items are sent to the third device by the first device as each of the first remaining inspection items is completed and wherein the second updates on the completion of the second remaining inspection items are sent to the third device by the second device as each of the second remaining inspection items is completed A further aspect of the present invention describes a method comprising: receiving an inspection plan for an asset from a host computer; receiving a first request for a first assignment for the asset from a first inspection assistance device; receiving a second request for a second assignment for the asset from a second inspection assistance device; determining if there are multiple unfinished sections of the inspection plan for the asset; if there are multiple unfinished sections of the inspection plan for the asset, sending the first section of the inspection plan for the asset to the first inspection assistance device and sending the second section of the inspection plan for the asset to the second inspection assistance device; receive first updates on the completion of the first section of the inspection plan from the first inspection assistance device and receive second updates on the completion of the second section of the inspection plan from the second inspection assistance device; and sending the first and second updates to the host computer.

And yet a further aspect of the present invention imparts a non-transient computer-readable medium containing program instructions for causing a computer to perform a method comprising: receiving an inspection plan for an asset from a host computer; receiving a first request for a first assignment for the asset from a first inspection assistance device; receiving a second request for a second assignment for the asset from a second inspection assistance device; determining if there are multiple unfinished sections of the inspection plan for the asset; if there are multiple unfinished sections of the inspection plan for the asset, sending the first section of the inspection plan for the asset to the first inspection assistance device and sending the second section of the inspection plan for the asset to the second inspection assistance device; receive first updates on the completion of the first section of the inspection plan from the first inspection assistance device and receive second updates on the completion of the second section of the inspection plan from the second inspection assistance device; and sending the first and second updates to the host computer.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIGS. 5A and 5B are communication flow diagrams for the multiple inspector voice-directed inspection system according to embodiments of the disclosed subject matter.

DETAILED DESCRIPTION

Embodiments of the present invention relate to systems, methods, and devices of a voice-directed inspection system that supports multiple inspectors in the inspection of business assets.

Figure 1:
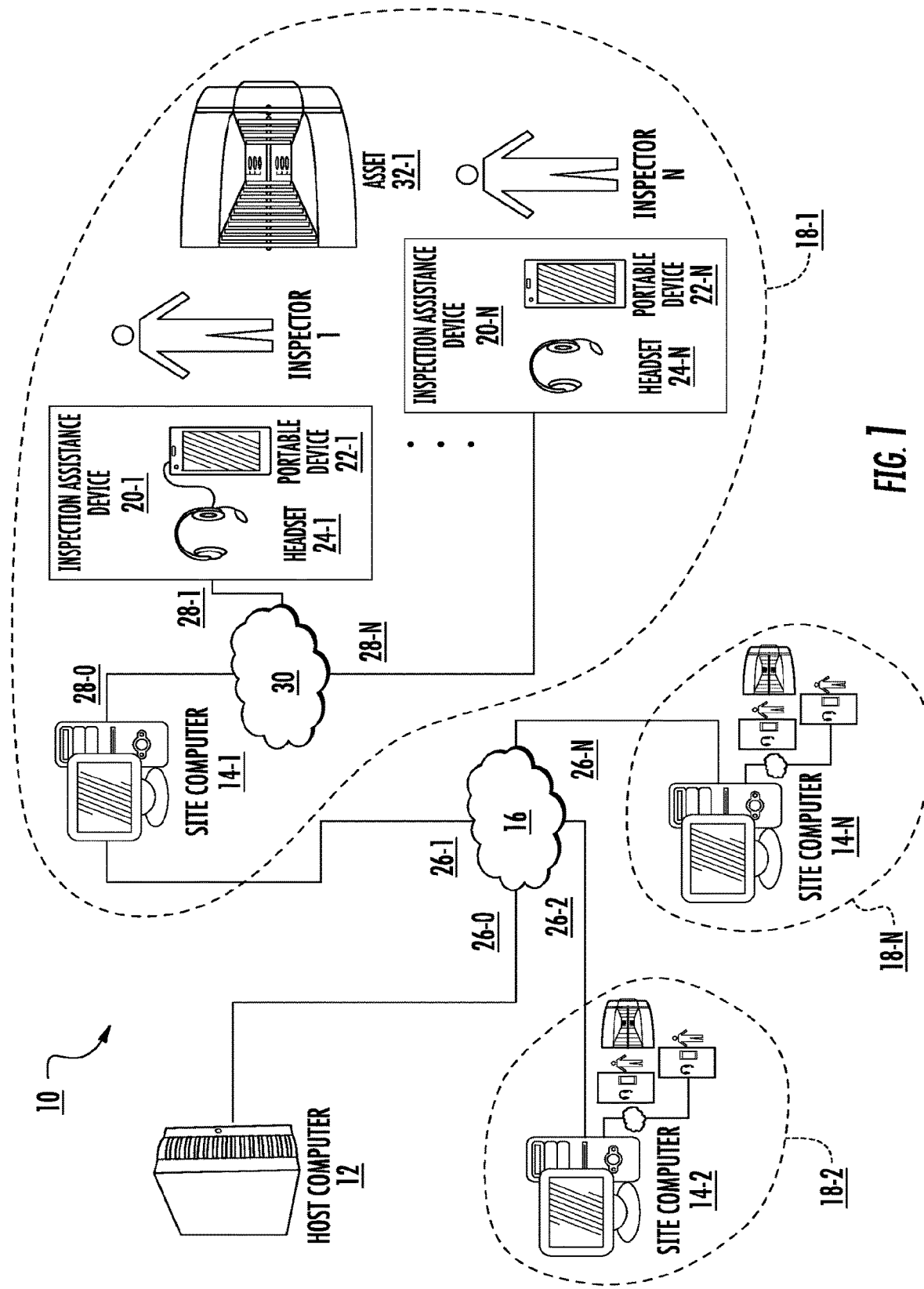
FIG. 1 is a diagram of the voice-directed inspection system according to embodiments of the disclosed subject matter.

FIG. 1 is a diagram of the voice-directed inspection system according to embodiments of the disclosed subject matter. As shown, the voice-directed inspection system 10 includes a host computer 12 and a plurality of site computers 14-1 through 14-N configured to communicate with the host computer 12 via a network 16. In some embodiments, the site computers 14 may also communicate with each other via the network 16.

Throughout the present disclosure, it should be noted that specific instances of components of the system shall be designated with an index, for example 14-1 indicating the first site computer and 14-N indicating the Nth site computer. When generically referring to a component, only the prefix will be used, for example the site computer 14 or the site computers 14.

Note that while the host computer 12 is illustrated as individual single computer, it may alternatively be distributed across multiple computers having the respective functionality of the single host computer 12 shown in FIG. 1. Similarly, note that while the site computers 14 are illustrated as individual single computers, they may alternatively be distributed across multiple computers having the respective functionality of the single site computer 14 shown in FIG. 1.

The network 16 may be any type of wide area network (WAN), such as the Internet, Local Area Network (LAN), or the like, or any combination thereof, and may include wired components, such as Ethernet, wireless components, such as LTE, Wi-Fi, Bluetooth™, or near field communication (NFC), or both wired and wireless components, collectively represented by the data links 26.

The host computer 12 may preferably be housed in a central office that services multiple inspection sites 18-1 through 18-N. The site computers 14 may be housed at a designated inspection sites 18 where inspections are performed. For example, the inspection site 18 may be a garage where vehicles are inspected or where other types of transportable objects can be brought. In other cases, the inspection site 18 may be the location of a fixed object being inspected, such as a home or building.

One or more of the site computers 14 may be configured as web servers. The voice-directed inspection system 10 may further include one or more additional servers (not shown), which may be housed at the central office, in a remote office, at a third party location, at one or more of the inspection sites 18, or at another suitable location.

Within the inspection site 18, the site computer 14 is configured to communicate with one or more inspection assistance devices 20-1 through 20-N. Each inspection assistance device 20 includes at least a portable computer device 22 and a headset 24. In some embodiments, the site computer 14 and inspection assistance devices 20 may communicate directly using a wireless protocol, such as Bluetooth™. In other embodiments, the site computer 14 and inspection assistance devices 20 may communicate with each other via a network 30. The network 30 may be any type of wide area network (WAN), such as the Internet, Local Area Network (LAN), or the like, or any combination thereof, and may include wired components, such as Ethernet, wireless components, such as LTE, Wi-Fi, Bluetooth™, or near field communication (NFC), or both wired and wireless components, collectively represented by the data links 28. The inspection site 18 also includes the business asset 32 being inspected.

Figure 2:
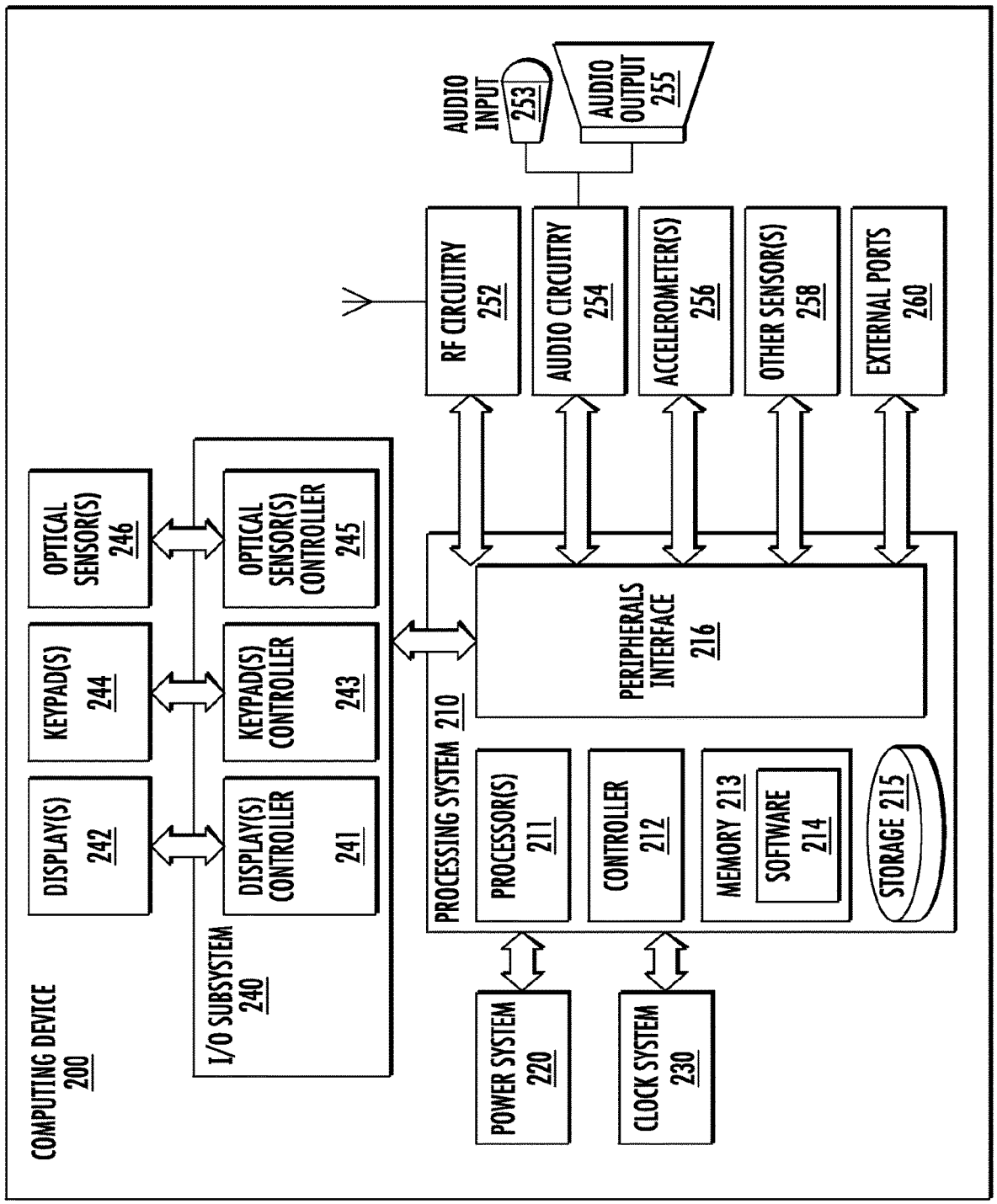
FIG. 2 is a block diagram of the hardware elements of a computing device according to embodiments of the disclosed subject matter.

FIG. 2 is a block diagram of the hardware elements of a computing device according to embodiments of the disclosed subject matter. More specifically, FIG. 2 is a block diagram of the hardware elements of a computing device 200 that may serve as the host computer 12 or site computer 14 or, in some embodiments, the portable computer device 22 of the inspection assistance device 20.

Computing device 200 may be implemented in any form of digital computer or mobile device. Digital computers may include, but are not limited to, laptops, desktops, workstations, fixed vehicle computers, vehicle mount computers, hazardous environment computers, rugged mobile computers, servers, blade servers, mainframes, other appropriate computers. Mobile devices may include, but are not limited to, cellular telephones, smartphones, personal digital assistants, tablets, pagers, two-way radios, netbooks, and other similar computing devices.

In general, as shown, the computing device 200 of FIG. 2 includes a processing system 210 that includes one or more processors 211, such as Central Processing Units (CPUs), Application Specific Integrated Circuits (ASICs), and/or Field Programmable Gate Arrays (FPGAs), a memory controller 212, memory 213, such as Random Access Memory (RAM), which may include software 214, and other components that are not shown for brevity, such as busses, etc. The processing system may also include storage 215, such as a hard drive or solid state drive.

Memory 213 and storage 215 may include one or more internally fixed storage units, removable storage units, and/or remotely accessible storage units, each including a tangible storage medium. The various storage units may include any combination of volatile memory and non-volatile memory. For example, volatile memory may comprise random access memory (RAM), dynamic RAM (DRAM), etc. Non-volatile memory may comprise read only memory (ROM), electrically erasable programmable ROM (EEPROM), flash memory, etc. The storage units may be configured to store any combination of information, data, instructions, software code, etc.

The processing system 210 also includes a peripherals interface 216 for communicating with other components of the computing device 200, which may include but are not limited to, radio frequency (RF) circuitry 252, such as Wi-Fi and/or cellular communications circuitry such as wireless Ethernet, Bluetooth™, and near field communication (NFC), audio circuitry 254 for the audio input component 253, such as a microphone, and audio output component 255, such as a speaker, one or more accelerometers 256, one or more other sensors 258, such as a location determination component such as a Global Positioning System (GPS) chip, and one or more external ports 260, which may be used for smart card readers or for wired connections such as wired Ethernet, USB, serial or I²C ports. The RF circuitry 252 and external ports 260 individually and collectively make up the communication interfaces for the computing device 200. Other sensors 258 may also include an NFC reader or additional NFC chips. The processing system 210 is also connected to a power system component 220 that is used to power the computing device 200, such as a battery or a power supply unit. The processing system 210 is also connected to a clock system component 230 that controls a timer for use by the disclosed embodiments.

The peripherals interface 216 may also communicate with an Input/Output (I/O) subsystem 240, which includes a display(s) controller 241 operative to control display(s) 242. In some embodiments the display(s) 242 is a touch-sensitive display system, and the display(s) controller 241 is further operative to process touch inputs on the touch sensitive display 242. The I/O subsystem 240 may also include a keypad(s) controller 243 operative to control keypad(s) 244 on the computing device 200. The I/O subsystem 240 also includes an optical sensor(s) controller 245 operative to control one or more optical sensor(s) 246. The optical sensor(s) may be part of other components, such as lenses, ring spacers, and lens barrels (not shown), that make up a camera or image scanner on the computing device 200. The components of computing device 200 may be interconnected using one or more buses, represented generically by the arrows of FIG. 2, and may be mounted on a motherboard (not shown) or some other appropriate configuration.

Computing device 200 may have additional input/output components (not shown). Additional input components may include, hut are not limited to, keyboards, buttons, switches, touch pads, cursor control devices, computer mice, stylus-receptive components, or other data entry devices. Additional output components may include, but are not limited to, computer monitors, buzzers, alarms, notification devices, lights, light emitting diodes, liquid crystal displays, visual display devices, or other data output devices.

Figure 3:
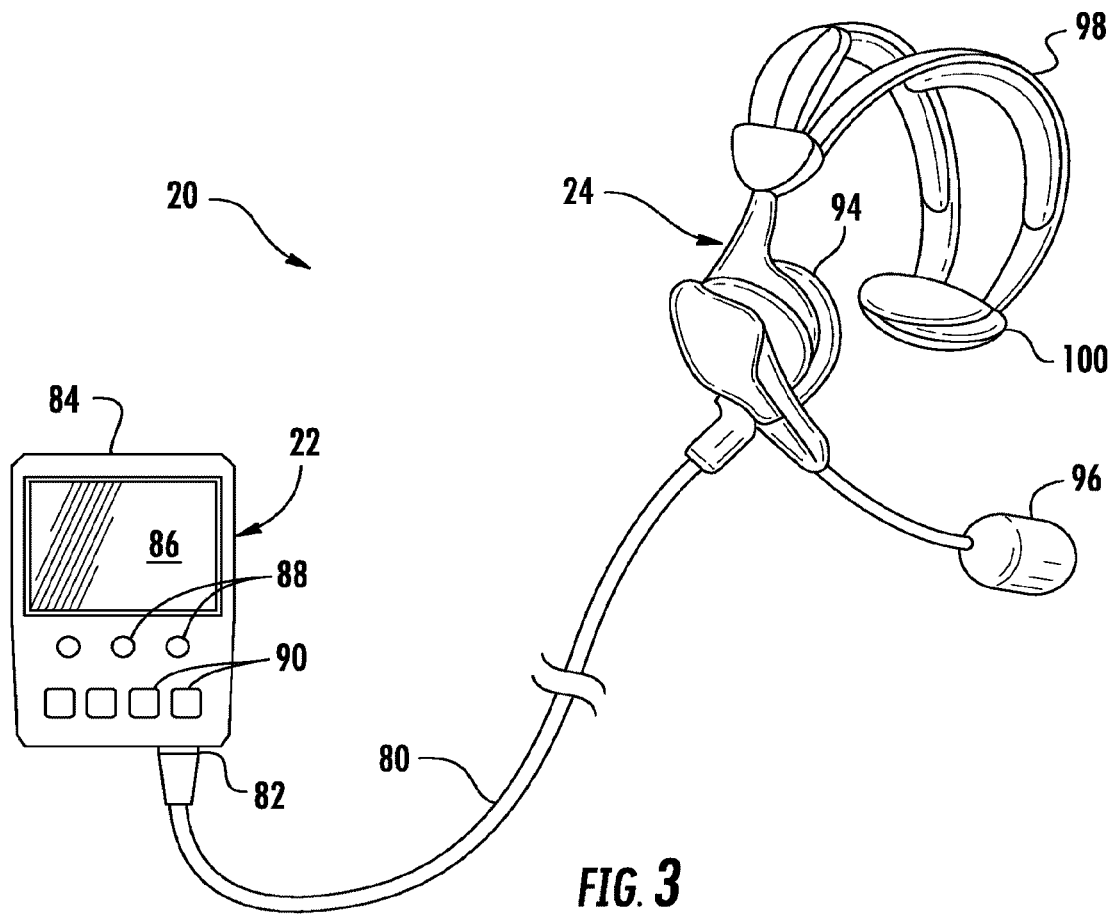
FIG. 3 is a diagram of the hardware elements of an inspection assistance device according to embodiments of the disclosed subject matter.

FIG. 3 is a diagram of the hardware elements of an inspection assistance device according to embodiments of the disclosed subject matter. The inspection assistance device 20 includes the portable computer device 22 and headset 24, which can communicate with each other via cable 80 or over a wireless communication channel, such as Bluetooth™. The portable computer device 22 includes an input port 82, which is configured to be connected to a connector of the cable 80. The portable computer device 22 also includes a housing 84, a display screen 86, indicators 88, and input devices 90.

The headset 24 includes an audio output device 94 (e.g., speaker), an audio input device 96 (e.g., microphone), one or more straps 98, and padding 100. The padding of the audio input device 96 along with the straps 98 and padding 100 are configured to keep the headset 24 on an inspector's head during use.

The portable computer device 22 may be configured to run voice software, which supports efficient voice dialogs, speech recognition, noise cancellation, and language support. The portable computer device 22 translates textual instructions into audible commands, which are output through the audio output device 94. Also, the portable computer device 22 converts the inspector's speech received through the audio input device 96 into output data that is sent back to the site computer 14. In some embodiments, the portable computer device 22 may have an integrated imager that can scan and capture barcodes.

In some embodiments, the portable computer device 22 is a device like the computing device 200 described above complete with all of the hardware elements described for the computing device 200 above, including processors 211, interfaces 252 and 260, memory 213, storage 215 and the like. Additionally, the portable computer device 22 includes a speech module 118 and an inspection assistance program 120. The speech module 118 and the inspection assistance program 120 may be configured in software and/or firmware and stored in the memory 213 and/or storage 215 and/or may be configured in hardware within the portable computer device 22.

The external port 260 of the portable computer device 22 may include the input port 82 as shown in FIG. 3 for coupling with the cable 80. Alternatively, portable computer device 22 may include RF circuitry 252 for a short range wireless communication transceiver for wirelessly communicating with the headset 24. The portable computer device 22 also includes a transceiver or other suitable wired or wireless communication component for communicating with the site computer 14. The communication interfaces 252 and/or 260 allow the portable computer device 22 to receive inspection plans from the site computer 14 and provide inspection steps to the headset 24. When a step is performed by the inspector, the communication interfaces 252 and/or 260 receive inspection results from the headset 24 and communicate the results to the site computer 14.

The speech module 118 is configured to translate text to speech and to translate speech to text. For example, textual inspection steps may be translated into speech form that the inspector can understand. The speech module 118 may use other methods for conversion to speech, such as processing digital audio signals and converting to analog speech. The speech module 118 may include a text-to-speech (TTS) module.

The inspection assistance program 120 performs many tasks, including but not limited to: enabling the inspector to sign on, determining if the inspector is authorized for the inspection and/or inspection plan, accessing profile of the inspector on the portable computer device 22, receiving a first (or next) inspection plan automatically or in response to input received at the portable computer device 22 by the operator, delivering audible commands to the inspector regarding the steps of the plan to perform, receiving audible, vocal, or spoken responses from the inspector, determining if sections of the inspection plan should be skipped, determining and/or marking sections of the inspection plan as not applicable, requiring performance of mandatory sections of the inspection plan, determining if the inspection is complete, prompting for parts information and/or numbers, and enabling the inspector to review inspection results before submission.

The setup of the voice-directed inspection system 10 involves a variety of steps. When a business asset 32-1 arrives at a site 18-1, the host computer 12 sends one or more exemplary inspection plans to the site computer 14-1. For example, an inspection plan may include a specific order of steps to be taken by an inspector during an inspection of the business asset 32-1. Each exemplary inspection plan may include a number of sections, wherein each section includes a list of steps to be performed in the inspection. The sections and steps may be arranged to maximize efficiency and accuracy. In some embodiments, the sections of the inspection plan may be aligned with physical parts of the business asset 32-1. For example, in the case of a business asset 32-1 that is a tractor-trailer, the inspection plan may naturally be divided into sections that cover the cab and sections that cover the trailer. In still other embodiments, the sections of the inspection plan may be divided so as to create discrete sections of the plan that would permit multiple inspectors to work on the business asset 32-1 in a manner that would not overlap or interfere with each other. For example, in the case of a business asset 32-1 that is a jet engine, the inspection plan may be divided into sections that allow one inspector to work on elements at the front of the engine and another inspector to work on elements at the rear of the engine. In further embodiments, the sections of the inspection plan may be divided across component systems of the business asset 32-1. For example, an automobile inspection plan may include many sections representing many distinct systems of the automobile, such as a section related to the lights of the automobile, a section related to the braking system of the automobile, a section related to the steering system, a section related to emissions components, among other sections.

The site computer 14 is configured to receive the one or more exemplary inspection plans and store the inspection plans. The site computer 14 may include an inspection plan editor 40 described further below, which may be configured to translate the inspection steps received from the host computer 12 into voice instructions. The inspection plan editor may also be configured to enable an operator to modify the voice instructions as needed. For example, when new parts are added to a list of parts to be inspected, the operator may insert additional steps in the instructions, which are translated into additional voice instructions. In some embodiments, the voice-directed inspection system 10 may include a regional server that is configured to modify inspections for each of a plurality of inspection sites 18 within a particular region.

Thus, the voice-directed inspection system 10 is set up when the exemplary inspection plans are downloaded and modified, as needed, for each inspection site 18. After set up, the site computer 14 at each inspection site 18 is configured to communicate the appropriate inspection plan to the respective inspection assistance devices 20. With the inspection plan loaded in the inspection assistance device 20, the inspector may begin the inspection. The voice-directed inspection involves providing audible prompts to the inspector to perform certain steps (e.g., measuring, testing, or observing characteristics of various parts or components) and receiving audible responses from the inspector.

Figure 4:
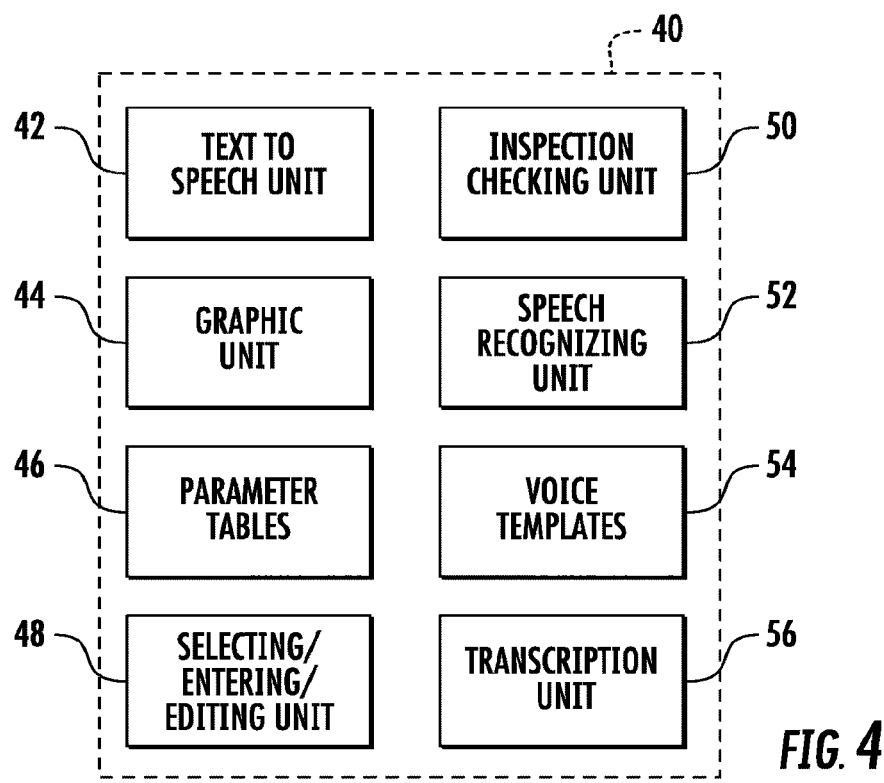
FIG. 4 is a block diagram of an inspection plan editor according to embodiments of the disclosed subject matter.

FIG. 4 is a block diagram of an inspection plan editor according to embodiments of the disclosed subject matter. The inspection plan editor 40 may be implemented in hardware, software, firmware, or any combinations thereof. The inspection plan editor 40 may be configured as software and/or firmware stored on a non-transitory computer-readable medium on memory 213 and/or storage 215 of a site computer 14. In some embodiments, the inspection plan editor 40 may be implemented in software or firmware that is stored on a non-transitory computer-readable medium on the memory 213 and/or storage 215 or combinations thereof and that is executable by a suitable instruction execution system, such as the processor 211 of a site computer 14. In other embodiments, if the inspection plan editor is implemented in hardware, then the inspection plan editor 40 may be implemented using discrete logic circuitry, an application specific integrated circuit (ASIC), a programmable gate array (PGA), a field programmable gate array (FPGA), or any combinations thereof.

The inspection plan editor 40 may comprise an ordered listing of executable instructions for implementing logical functions. The inspection plan editor 40 can be embodied in any non-transitory computer-readable medium for use by an instruction execution system or device, such as a computer-based system, processor-controlled system, etc. In the context of the present disclosure, a non-transitory computer-readable medium can be any medium that can contain, store, communicate, propagate, or transport programs for execution by the instruction execution system or device.

It should be understood that the routines, steps, processes, or operations described herein with respect to the inspection plan editor 40 may represent any module or code sequence that can be implemented in software or firmware. In this regard, these modules and code sequences can include commands or instructions for executing the specific logical routines, steps, processes, or operations within physical components. It should further be understood that two or more of the routines, steps, processes, and/or operations described herein may be executed substantially simultaneously or in a different order than explicitly described, as would be understood by one of ordinary skill in the art.

The inspection plan editor 40 allows an operator, such as an administrator of one or more inspection sites 18, to enter a number of parameters related to an inspection plan. The inspection plan editor 40 enables the operator to create a new inspection plan and/or to edit an existing inspection plan. After the operator has gone through the process of creating and/or modifying the inspection plan, the inspection plan can then be communicated to the inspection assistance device 20 for directing the inspector through an inspection. The created and/or modified inspection plan can be used by one or more inspectors as needed.

The inspection plan editor 40 may utilize a text-to-speech (ITS) unit 42 to translate inspection instructions from textual form to voice. Also, the inspection plan editor 40 may utilize a graphics unit 44 in coordination with a graphical user interface (GUI) of the input/output subsystem 240 of the site computer 14 to graphically display the textual inspection instructions in order to simplify the user experience.

The inspection instructions include various parameters that can be configured by the operator. The parameters for defining the inspection instructions can be stored in parameter tables 46 of the inspection plan editor 40. The inspection plan editor 40 allows the operator to select, enter, and/or edit the parameters using a selecting/entering/editing unit 48. For example, the operator may select/enter/edit a textual prompt that will be provided in speech form to the inspector at the beginning of the inspection. The operator may also select, enter, and/or edit a TTS prompt that the inspector will hear when the inspector requests for help.

Furthermore, the selecting/entering/editing unit 48 of the inspection plan editor 40 allows the operator to select, enter, and/or edit a limit representing a maximum number of choices to be provided in a list. The inspection plan editor 40 may define a unique identifier of the inspector's choice that is reported back to the host computer 12. For numerical entry, the operator can define the minimum and maximum acceptable values for various observable parameters, as well as the minimum and maximum digits allowed.

The user can also choose whether or not the inspector's choice receives a confirmation for various situations. The selecting/entering/editing unit 48 also allows the operator to select, enter, and/or edit the type of confirmation provided, if applicable.

The selecting/entering/editing unit 48 of the inspection plan editor 40 also enables the operator to choose whether or not a display will be used in parallel with the voice instructions. Also, the operator may select, enter, and/or edit what images will be displayed on the portable computer device 22 for different situations.

In addition, the inspection plan editor 40 allows the operator to select, enter, and/or edit conditional actions, if needed. For example, if the inspector encounters a first condition, the inspection plan editor 40 can provide follow-up actions as defined by the operator.

Note, throughout this disclosure, while the user interacting with the site computer 14 is generally referred to as the operator and the user interacting with the inspection assistance device 20 is generally referred to as the inspector, it should be understood that the same user could be acting in both roles in certain embodiments.

The inspection plan editor 40 also allows the user to choose whether the inspector may utilize a scanner to enter values (e.g., alphanumeric entries). Also, voice input may be defined for entering times and dates.

The inspection plan editor 40 further includes a speech recognition unit 52. For words and phrases that inspectors use repeatedly, such as numbers and letters, the speech recognition unit 52 relies on saved voice templates 54 that inspectors train when beginning to use the voice system. As inspectors continue to use the words in their responses with the varying inflections of normal human speech, the speech recognition unit 52 automatically adapts the voice templates 54. Over time, the adaptation of an inspector's voice templates 54 improves the performance of the speech recognition unit 52.

The speech recognition unit 52 can also recognize voice selections from long item lists. Voice software running on the inspection assistance device 20 uses a speaker-independent recognition system based on phonemes (word parts) to create the voice templates 54. The headsets 24 may use the voice software to recognize speech and account for changes in speaking patterns over time and in different environments in order to improve voice recognition and system performance.

At times, an inspector may need to add free-form recorded audio when selections in the inspection plan are not sufficient to encompass every possibility. In this case, a transcription unit 56 of the inspection plan editor 40 can be used to recognize and automatically convert voice to text. However, since automated transcription may not always be correct, inspectors can review the text and correct it as needed after the inspection is complete. An inspection checking unit 58 of the inspection plan editor 40 enables the inspectors to review the inspection results.

According to some embodiments, one or more inspection plans may be created and/or modified at the host computer 12, at an inspection site 18, or at another location in communication with the network 16. Once the inspection plans are complete, they may be transmitted to one or more of the site computers 14 within the voice-directed inspection system 10 to allow the respective inspection sites 18 to benefit from the new or modified inspection plans. The inspection plans can then be stored in the memory 213 and/or storage 215 of the various site computers 14.

In some embodiments, the host computer 12 may communicate with the site computers 14 to provide instructions regarding which steps of the inspection plan are to be performed. In this respect, each inspection plan may be a comprehensive plan including all possible inspection steps. The host computer 12 can then select a subset of steps from the comprehensive plan. This allows changes to be made in an efficient manner without relying on each inspector's ability to make appropriate modifications. However, if needed, the inspection plans can be modified at each inspection site 18 to account for the particular features of that inspection site 18.

When the memory 213 and/or storage 215 of the site computer 14 is updated with the new and/or modified inspection plan(s), the site computer 14 can transmit the plan to the inspection assistance device(s) 20 according to an inspection schedule. As the inspector performs the steps defined in the inspection plan, the results of each step are transmitted back to the site computer 14 and stored in the memory 213 and/or storage 215 of the site computer 14 with the inspection plan editor 40. After the inspection is complete and the inspector checks the inspection results, the stored inspection results can be transmitted from the site computer 14 to the host computer 12. Transmission of the network 16 may include Internet encryption, such as secure sockets layer (SSL) encryption.

The inspection checking unit 50 is used when an inspector finishes an inspection. The inspector can view the results using the GUI on the site computer 14. When free-form speech is entered by the inspector using the transcription unit 56, the transcript can be viewed and edited as needed. The inspection checking unit 58 may also be configured to allow viewing of inspection assignments, inspection assistance device operators, and other system information. With inspector confirmation, the inspection checking unit 58 enables the processor 211 to submit the completed data to the host computer 12 via the communication interfaces 252 and/or 260.

The inspection checking unit 58 provides users with the ability to view information about each inspection step on mobile devices or PCs running supported browsers. Also, the portable computer device 22 may be configured to serve web pages to browsers on the same local area network (LAN) as the site computer 14.

For certain business assets 32, the inspection plans can be very large and involve many, many steps. For these types of inspections, it is often necessary to have more than one inspector work together to complete the inspection in a reasonable amount of time. By splitting up the steps of a given inspection plan into sections according to embodiments of the present disclosure, it is possible to allow multiple inspectors to work on the same business asset 32 in parallel. This would increase overall efficiency by creating a more continuous and steady flow of work for the inspectors and by allowing multiple inspectors to help complete the steps of an inspection plan. By splitting up or sectioning inspection plans, it is possible to employ any inspector who is available, even for a small amount of time, to help complete open work items. Aside from general efficiency, the sectioning of the inspection plan can be used to train new inspectors and to allocate inspectors with specialized skills.

In most traditional voice-directed inspection systems, there is a notion of an assignment. An assignment links a business asset and an inspection plan for the asset to a particular inspector. In most traditional voice-directed inspection systems, once an assignment is made, i.e. once a business asset and plan have been assigned to an inspector, only that inspector can complete the work. A multiple inspector voice-directed inspection system, with sectioned inspection plans, however, includes the ability to allow more than one inspector to work on a business asset at a time. Such a system also includes rules and features designed to determine when inspectors should be able to login and get assignments for the same asset concurrently. The multiple inspector voice-directed inspection system also allows multiple inspectors to work on a given inspection plan, regardless of whether or not it has been started by another inspector, as long as there is still open work items to complete, i.e. allowing multiple inspector identifiers to be associated to the same inspection plan and asset. A multiple inspector voice-directed inspection system also supports the ability for inspectors to specifically request sections of an inspection plan for a business asset.

Figure 5B:
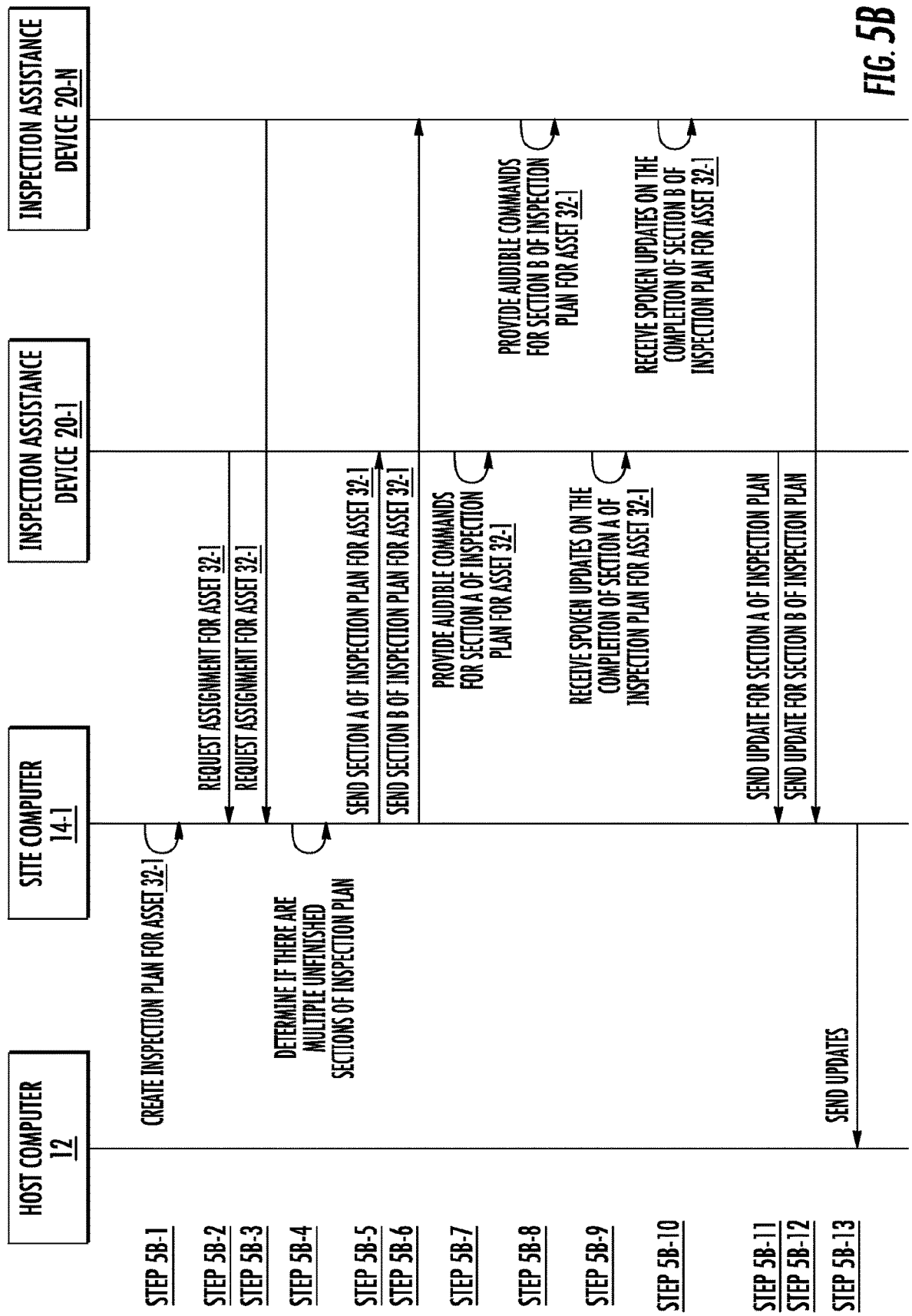

FIGS. 5A and 5B are communication flow diagrams for the multiple inspector voice-directed inspection system according to embodiments of the disclosed subject matter. In FIG. 5A, the host computer 12 sends an inspection plan for asset 32-1 to the site computer 14-1 (Step 5A-1). The inspection assistance device 20-1 requests an assignment for asset 32-1 in Step 5A-2, and inspection assistance device 20-N does the same in Step 5A-3. The site computer 14-1 determines if there are multiple unfinished sections of the inspection plan for the asset 32-1 (Step 5A-4). If there are unfinished sections, then the site computer 14-1 sends a section A of the inspection plan for asset 32-1 to inspection assistance device 20-1 (Step 5A-5) and sends a section B of the inspection plan for asset 32-1 to inspection assistance device 20-N(Step 5A-6).

In some embodiments, sections A and B of the inspection plan are non-overlapping. In other embodiments, the sections A and B of the inspection plan are prioritized according to features of the asset 32-1 that are more important to inspect.

Inspection assistance device 20-1 then provides audible commands for section A of the inspection plan for asset 32-1 (Step 5A-7), and receives audible, vocal, or spoken updates from the inspector on the completion of section A of the inspection plan for asset 32-1 (Step 5A-9). Similarly, inspection assistance device 20-N then provides audible commands for section B of the inspection plan for asset 32-1 (Step 5A-8), and receives audible, vocal, or spoken updates from the inspector on the completion of section B of the inspection plan for asset 32-1 (Step 5A-10). Inspection assistance device 20-1 then sends the updates for section A of the inspection plan for asset 32-1 to the site computer 14-1 (Step 5A-11), and inspection assistance device 20-N does the same for the updates for section B of the inspection plan (Step 5A-12). In some embodiments, the updates for sections A and B of the inspection plan are sent by inspection assistance devices 20-1 and 20-N respectively as the individual steps of each section of the inspection plan are complete. In alternative embodiments, the updates may be batched and sent by the inspection assistance devices 20. The site computer 14-1 then sends the updates to the entire inspection plan (both sections A and B) to the host computer 12.

FIG. 5B is similar to FIG. 5A described above, with the only exception being that the inspection plan in FIG. 5B is created on the site computer 14-1 (Step 5B-1), whereas it is received from the host computer 12 in FIG. 5A (Step 5A-1).

Figure 6:
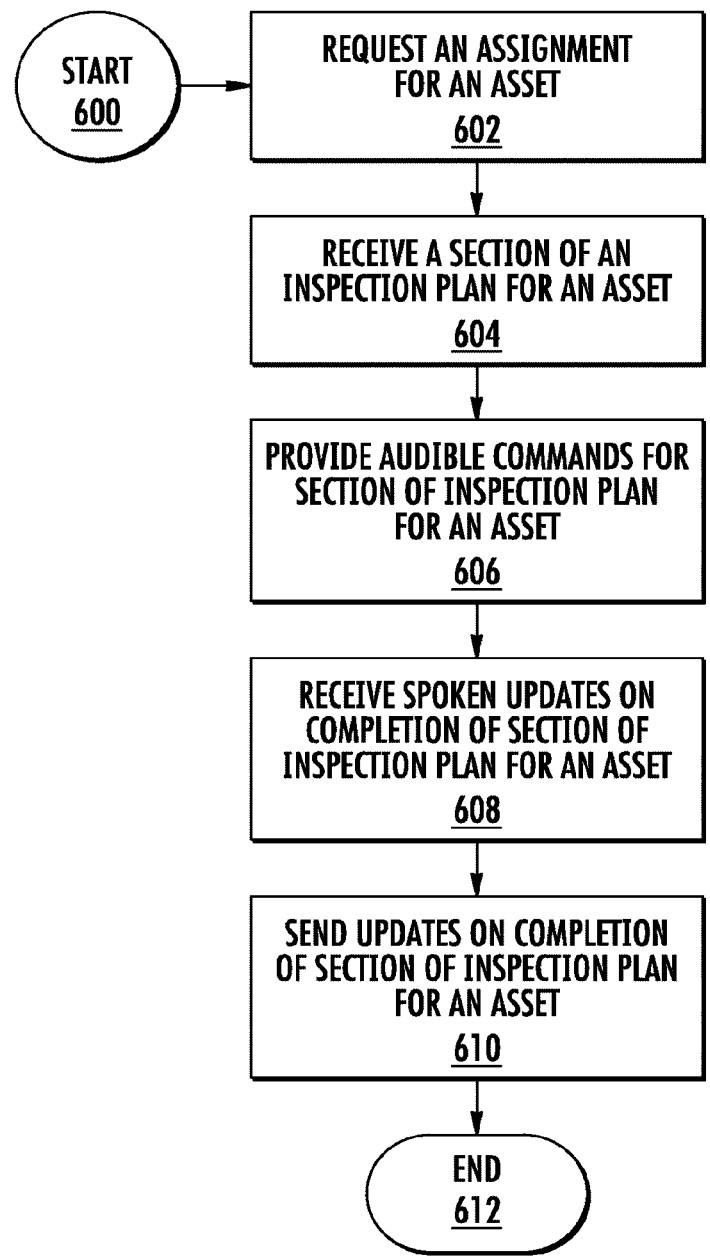
FIG. 6 is a flow chart for an inspection assistance device according to embodiments of the disclosed subject matter.

FIG. 6 is a flow chart for an inspection assistance device according to embodiments of the disclosed subject matter. The process starts (Step 600) and continues with the inspection assistance device 20 sending a request to the site computer 14 for an assignment for a business asset 32 (Step 602). As discussed, in some embodiments, the request may specify a specific section of an inspection plan for the asset 32. The inspection assistance device 20 then receives a section of the inspection plan for the asset 32 (Step 604). The inspection assistance device 20 then provides audible commands for the section of the inspection plan that was received (Step 606). The inspection assistance device 20 receives audible, vocal, or spoken updates on the completion of the section of the inspection plan that was received (Step 608). Lastly, the inspection assistance device 20 sends the updates on the completion of the section of the inspection plan for the business asset to the site computer 14 (Step 610), and the process ends (Step 612).

Figure 7:
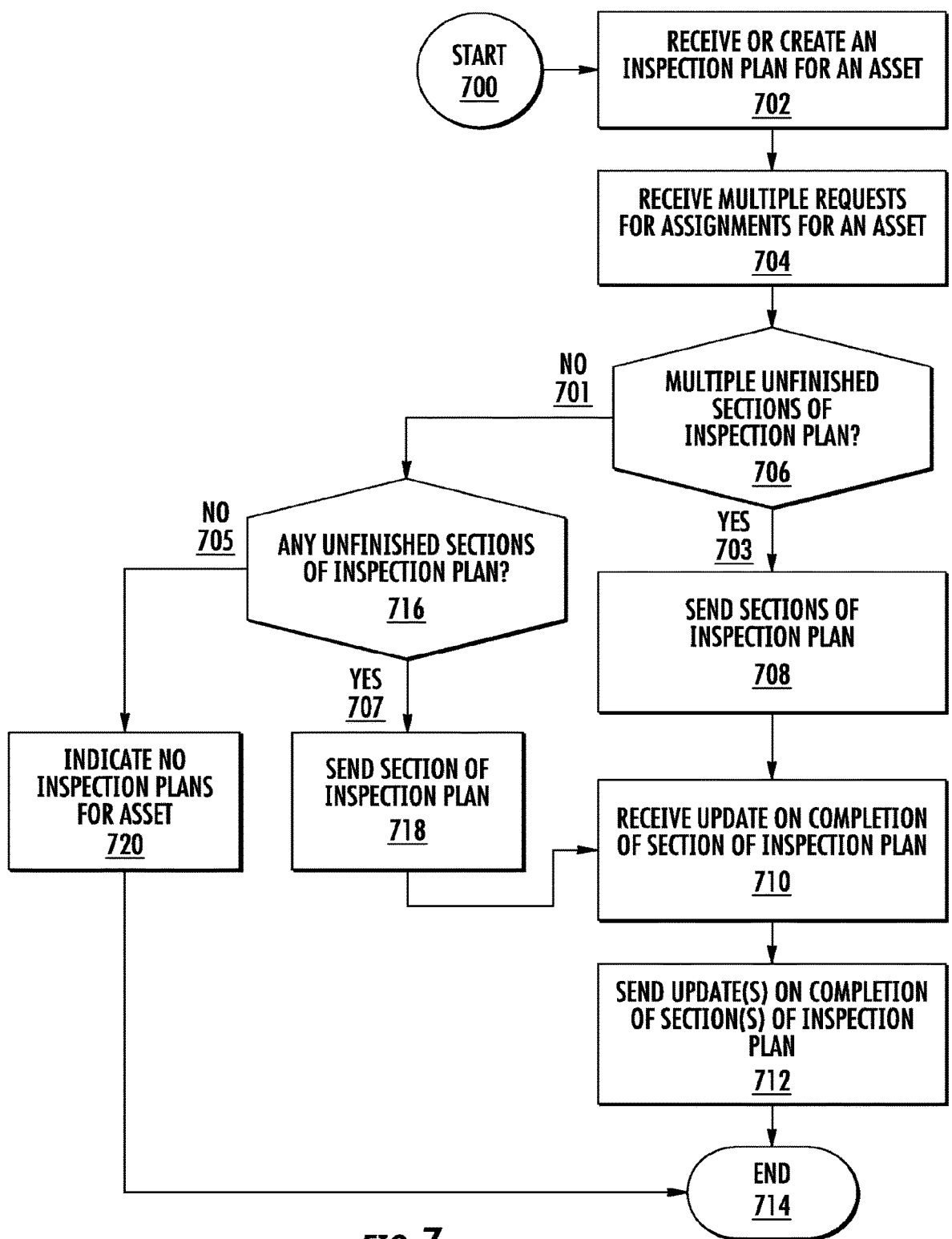
FIG. 7 is a flow chart for a site computer according to embodiments of the disclosed subject matter.

FIG. 7 is a flow chart for a site computer according to embodiments of the disclosed subject matter. The process starts (Step 700) and continues with the site computer 14 either receiving an inspection plan for a business asset 32 from the host computer 12 or creating an inspection plan for a business asset 32, depending upon the embodiment (Step 702). The site computer 14 then receives multiple requests for assignments for a business asset 32 from different inspection assistance devices 20 (Step 704). The site computer 14 then checks to see if there are multiple unfinished sections of the inspection plan (Step 706). If there are (Path 703), then the site computer 14 responds to the multiple requests for assignment by sending sections of the inspection plan to the respective inspection assistance devices 20 (Step 708).

In alternative embodiments, the site computer 14 sends the sections of the inspection plan to the inspection assistance devices 20 based on the order of importance in completing the inspection plan. In some embodiments, the site computer 14 sends the prioritized sections of the inspection plan to the inspection assistance devices 20 based on the order in which the site computer 14 received the request for an assignment from the inspection assistance devices 20. In other embodiments, the site computer 14 delivers the sections to the inspection assistance devices 20 associated with the inspectors most qualified to complete the work. In more embodiments, the site computer 14 delivers the sections to the inspection assistance devices 20 associated with inspectors who had previously worked on those respective sections of the inspection plan for that business asset 32.

The site computer 14 then receives updates on the completion of the sections of the inspection plan from each of the inspection assistance devices 20 (Step 710) and sends the update on the completion of the inspection plan to the host computer 12 (Step 712) and the process ends (Step 714).

If there are not multiple unfinished sections of the inspection plan (Step 706, Path 701), then the site computer 14 checks to see if there are any unfinished sections of the inspection plan (Step 716) and if there are (Path 707) sends that unfinished section to one of the requesting inspection assistance devices 20 (Step 718). The site computer 14 then receives the updates (Step 710), sends them to the host computer 12 (step 712), and the process ends (Step 714).

In some embodiments, the site computer 14 sends the remaining unfinished section of the inspection plan to the inspection assistance device 20 which first requested an assignment from the site computer 14. In other embodiments, the site computer 14 delivers the unfinished section to the inspection assistance device 20 associated with the inspector most qualified to complete the work. In more embodiments, the site computer 14 delivers the unfinished section to the inspection assistance device 20 associated with an inspector had previously worked on that section or other sections of the inspection plan for that business asset 32.

If there are no unfinished sections of the inspection plan (Step 716, Path 705), then the site computer 14 indicates that there are no inspection plans for the asset 32 (Step 720) and the process ends (Step 714).

The disclosed subject matter may be embodied as devices, systems, methods, and/or computer program products. Accordingly, some or all of the disclosed subject matter may be embodied in hardware and/or in software (including firmware, resident software, microcode, state machines, gate arrays, etc.). Furthermore, the disclosed subject matter may take the form of a computer program product on a computer-usable or computer-readable storage medium having computer-usable or computer-readable program code embodied in the medium for use by or on conjunction with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnet, optical, electromagnetic, infrared, or semiconductor system, apparatus, device or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, Random Access Memory (RAM), Read-Only Memory (ROM), Electrically Erasable Programmable Read-Only Memory (EEPROM), flash memory or other memory technology, compact disc read-only memory (CD-ROM), digital versatile disks (DVD), or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, or otherwise processed in a suitable manner, if necessary, and then stored in a computer memory.

To supplement the present disclosure, this application incorporates entirely by reference the following commonly assigned patents, patent application publications, and patent applications:

U.S. Pat. Nos. 6,832,725; 7,128,266;
7,159,783; 7,413,127;
7,726,575; 8,294,969;
8,317,105; 8,322,622;
8,366,005; 8,371,507;
8,376,233; 8,381,979;
8,390,909; 8,408,464;
8,408,468; 8,408,469;
8,424,768; 8,448,863;
8,457,013; 8,459,557;
8,469,272; 8,474,712;
8,479,992; 8,490,877;
8,517,271; 8,523,076;
8,528,818; 8,544,737;
8,548,242; 8,548,420;
8,550,335; 8,550,354;
8,550,357; 8,556,174;
8,556,176; 8,556,177;
8,559,767; 8,599,957;
8,561,895; 8,561,903;
8,561,905; 8,565,107;
8,571,307; 8,579,200;
8,583,924; 8,584,945;
8,587,595; 8,587,697;
8,588,869; 8,590,789;
8,596,539; 8,596,542;
8,596,543; 8,599,271;

8,599,957; 8,600,158;
8,600,167; 8,602,309;
8,608,053; 8,608,071;
8,611,309; 8,615,487;
8,616,454; 8,621,123;
8,622,303; 8,628,013;
8,628,015; 8,628,016;
8,629,926; 8,630,491;
8,635,309; 8,636,200;
8,636,212; 8,636,215;
8,636,224; 8,638,806;
8,640,958; 8,640,960;
8,643,717; 8,646,692;
8,646,694; 8,657,200;
8,659,397; 8,668,149;
8,678,285; 8,678,286;
8,682,077; 8,687,282;
8,692,927; 8,695,880;
8,698,949; 8,717,494;
8,717,494; 8,720,783;
8,723,804; 8,723,904;
8,727,223; 8,702,237;
8,740,082; 8,740,085;
8,746,563; 8,750,445;
8,752,766; 8,756,059;
8,757,495; 8,760,563;
8,763,909; 8,777,108;
8,777,109; 8,779,898;
8,781,520; 8,783,573;
8,789,757; 8,789,758;
8,789,759; 8,794,520;
8,794,522; 8,794,525;
8,794,526; 8,798,367;
8,807,431; 8,807,432;
8,820,630; 8,822,848;
8,824,692; 8,824,696;
8,842,849; 8,844,822;
8,844,823; 8,849,019;
8,851,383; 8,854,633;
8,866,963; 8,868,421;
8,868,519; 8,868,802;
8,868,803; 8,870,074;
8,879,639; 8,880,426;
8,881,983; 8,881,987;
8,903,172; 8,908,995;
8,910,870; 8,910,875;
8,914,290; 8,914,788;
8,915,439; 8,915,444;
8,916,789; 8,918,250;
8,918,564; 8,925,818;
8,939,374; 8,942,480;
8,944,313; 8,944,327;
8,944,332; 8,950,678;
8,967,468; 8,971,346;
8,976,030; 8,976,368;
8,978,981; 8,978,983;
8,978,984; 8,985,456;
8,985,457; 8,985,459;
8,985,461; 8,988,578;
8,988,590; 8,991,704;
8,996,194; 8,996,384;
9,002,641; 9,007,368;
9,010,641; 9,015,513;
9,016,576; 9,022,288;
9,030,964; 9,033,240;
9,033,242; 9,036,054;
9,037,344; 9,038,911;
9,038,915; 9,047,098;
9,047,359; 9,047,420;
9,047,525; 9,047,531;
9,053,055; 9,053,378;
9,053,380; 9,058,526;
9,064,165; 9,064,167;
9,064,168; 9,064,254;
9,066,032; 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;

U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;

U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. Patent application Ser. No. 14/334,931 for a SYSTEM AND METHOD FOR INDICIA VERIFICATION, filed Jul. 18, 2014 (Heil);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HANDHELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HANDHELD DIMENSIONER WITH DATA-QUALITY INDICATION filed Oct. 21, 2014 (Laffargue et al.);
U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);
U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);
U.S. patent application Ser. No. 14/529,563 for ADAPTABLE INTERFACE FOR A MOBILE COMPUTING DEVICE filed Oct. 31, 2014 (Schoon et al.);
U.S. patent application Ser. No. 14/529,857 for BARCODE READER WITH SECURITY FEATURES filed Oct. 31, 2014 (Todeschini et al.);
U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);
U.S. patent application Ser. No. 14/531,154 for DIRECTING AN INSPECTOR THROUGH AN INSPECTION filed Nov. 3, 2014 (Miller et al.);
U.S. patent application Ser. No. 14/533,319 for BARCODE SCANNING SYSTEM USING WEARABLE DEVICE WITH EMBEDDED CAMERA filed Nov. 5, 2014 (Todeschini);
U.S. patent application Ser. No. 14/535,764 for CONCATENATED EXPECTED RESPONSES FOR SPEECH RECOGNITION filed Nov. 7, 2014 (Braho et al.);
U.S. patent application Ser. No. 14/568,305 for AUTO-CONTRAST VIEWFINDER FOR AN INDICIA READER filed Dec. 12, 2014 (Todeschini);
U.S. patent application Ser. No. 14/573,022 for DYNAMIC DIAGNOSTIC INDICATOR GENERATION filed Dec. 17, 2014 (Goldsmith);
U.S. patent application Ser. No. 14/578,627 for SAFETY SYSTEM AND METHOD filed Dec. 22, 2014 (Ackley et al.);
U.S. patent application Ser. No. 14/580,262 for MEDIA GATE FOR THERMAL TRANSFER PRINTERS filed Dec. 23, 2014 (Bowles);
U.S. patent application Ser. No. 14/590,024 for SHELVING AND PACKAGE LOCATING SYSTEMS FOR DELIVERY VEHICLES filed Jan. 6, 2015 (Payne);
U.S. patent application Ser. No. 14/596,757 for SYSTEM AND METHOD FOR DETECTING BARCODE PRINTING ERRORS filed Jan. 14, 2015 (Ackley);
U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.);

U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.);

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method for voice-directed inspection comprising:

receiving an inspection plan for performing an inspection of an asset from a host computer, wherein the inspection plan is divided into multiple sections;

receiving a first request from a first inspection assistance device via a first headset;

receiving a second request from a second inspection assistance device via a second headset;

in response to receiving the first request and the second request, determining if there are multiple unfinished sections of the inspection plan for the asset, wherein, in determining if there are multiple unfinished sections of the inspection plan for the asset, the method further comprises:

identifying unfinished sections of the inspection plan; and determining that the unfinished sections of the inspection plan do not interfere with one another;

translating textual instructions corresponding to inspection steps of the inspection plan, received from the host computer, into digital audio signals;

converting the audio signals into a plurality of analog speech instructions;

transmitting, via a first speaker of the first headset, a first analog speech instruction corresponding to a first unfinished section of the inspection plan for the asset to the first inspection assistance device and transmitting, via a second speaker of the second headset, a second analog speech instruction corresponding to a second unfinished section of the inspection plan for the asset to the second inspection assistance device;

receiving a first audible update on the first unfinished section of the inspection plan from the first inspection assistance device via the first headset and receiving a second audible update on the second unfinished section of the inspection plan from the second inspection assistance device via the second headset;

sending the first and second audible updates to the host computer; and in response to determining that there are no unfinished sections of the inspection plan for the asset, providing, via a voice command, an indication to the first inspection assistance device and the second inspection assistance device that there are no unfinished sections of the inspection plan for the asset.

2. The method of claim 1, wherein, when determining that the unfinished sections of the inspection plan do not interfere with one another, the method further comprises:
determining that the unfinished sections of the inspection plan pertain to physically distinct parts of the asset.

3. The method of claim 1, further comprising:
associating more than one identifier to the inspection plan for the asset.

4. The method of claim 1, wherein at least one of the first request or the second request comprises a request for any unfinished section of the inspection plan.

5. The method of claim 1, wherein at least one of the first request or the second request comprises a request for a specific unfinished section of the inspection plan.

6. The method of claim 1, wherein the first unfinished section and the second unfinished section are non-overlapping.

7. The method of claim 1, wherein the first unfinished section and the second unfinished section are prioritized according to features of the asset.

8. A site computer of a voice-directed inspection system comprising a memory and a processor communicatively coupled to the memory, the processor is configured to:
receive an inspection plan for performing an inspection of an asset from a host computer, wherein the inspection plan is divided into multiple sections;
receive a first request from a first inspection assistance device via a first headset;
receive a second request from a second inspection assistance device via a second headset;
in response to receiving the first request and the second request, determine if there are multiple unfinished sections of the inspection plan for the asset, wherein, in determining if there are multiple unfinished sections of the inspection plan for the asset, the processor is configured to:
identify unfinished sections of the inspection plan; and
determine that the unfinished sections of the inspection plan do not interfere with one another;
translate textual instructions corresponding to inspection steps of the inspection plan, received from the host computer, into digital audio signals;
convert the audio signals into a plurality of analog speech instructions;
transmit, via a first speaker of the first headset, a first analog speech instruction corresponding to a first unfinished section of the inspection plan for the asset to the first inspection assistance device and transmit, via a second speaker of the second headset, a second analog speech instruction corresponding to a second unfinished section of the inspection plan for the asset to the second inspection assistance device;
receive a first audible update on the first unfinished section of the inspection plan from the first inspection assistance device via the first headset and receive a second audible update on the second unfinished section of the inspection plan from the second inspection assistance device via the second headset;
send the first and second audible updates to the host computer; and
in response to determining that there are no unfinished sections of the inspection plan for the asset, provide, via a voice command, an indication to the first inspection assistance device and the second inspection assistance device that there are no unfinished sections of the inspection plan for the asset.

9. The site computer of claim 8, wherein, when determining that the unfinished sections of the inspection plan do not interfere with one another, the processor is configured to:
determine that the unfinished sections of the inspection plan pertain to physically distinct parts of the asset.

10. The site computer of claim 8, wherein the processor is configured to:
associate more than one identifier to the inspection plan for the asset.

11. The site computer of claim 8, wherein at least one of the first request or the second request comprises a request for any unfinished section of the inspection plan.

12. The site computer of claim 8, wherein at least one of the first request or the second request comprises a request for a specific unfinished section of the inspection plan.

13. The site computer of claim 8, wherein the first unfinished section and the second unfinished section are non-overlapping.

14. The site computer of claim 8, wherein the first unfinished section and the second unfinished section are prioritized according to features of the asset.

15. A non-transient computer-readable medium containing program instructions for causing a computer to perform a method for voice-directed inspection comprising:
receiving an inspection plan for performing an inspection of an asset from a host computer, wherein the inspection plan is divided into multiple sections;
receiving a first request from a first inspection assistance device via a first headset;
receiving a second request from a second inspection assistance device via a second headset;
in response to receiving the first request and the second request, determining if there are multiple unfinished sections of the inspection plan for the asset, wherein, in determining if there are multiple unfinished sections of the inspection plan for the asset, the program instructions for causing the computer to perform the method for voice-directed inspection further comprises:
identifying unfinished sections of the inspection plan; and
determining that the unfinished sections of the inspection plan do not interfere with one another;
translating textual instructions corresponding to inspection steps of the inspection plan, received from the host computer, into digital audio signals;
converting the audio signals into a plurality of analog speech instructions;
transmitting, via a first speaker of the first headset, a first analog speech instruction corresponding to a first unfinished section of the inspection plan for the asset to the first inspection assistance device, and transmitting, via a second speaker of the second headset, a second analog speech instruction corresponding to a second unfinished section of the inspection plan for the asset to the second inspection assistance device;
receiving a first audible update on the first unfinished section of the inspection plan from the first inspection assistance device via the first headset and receiving a second audible update on the second unfinished section of the inspection plan from the second inspection assistance device via the second headset;
sending the first and second audible updates to the host computer; and
in response to determining that there are no unfinished sections of the inspection plan for the asset, providing, via a voice command, an indication to the first inspection assistance device and the second inspection assistance device that there are no unfinished sections of the inspection plan for the asset.

16. The non-transient computer-readable medium of claim 15, wherein, when determining that the unfinished sections of the inspection plan do not interfere with one another, the program instructions for causing the computer to perform the method for voice-directed inspection further comprises:

determining that the unfinished sections of the inspection plan pertain to physically distinct parts of the asset.

17. The non-transient computer-readable medium of claim 15, wherein the program instructions for causing the computer to perform the method for voice-directed inspection further comprises:

associating more than one identifier to the inspection plan for the asset.

18. The non-transient computer-readable medium of claim 15, wherein at least one of the first request or the second request comprises a request for any unfinished section of the inspection plan.

19. The non-transient computer-readable medium of claim 15, wherein at least one of the first request or the second request comprises a request for a specific unfinished section of the inspection plan.

20. The non-transient computer-readable medium of claim 15, wherein the first unfinished section and the second unfinished section are non-overlapping.

\* \* \* \* \*